April 27, 1954  D. W. BOWERS, JR., ET AL  2,677,109
COAXIAL THERMISTOR MOUNT
Filed May 1, 1946
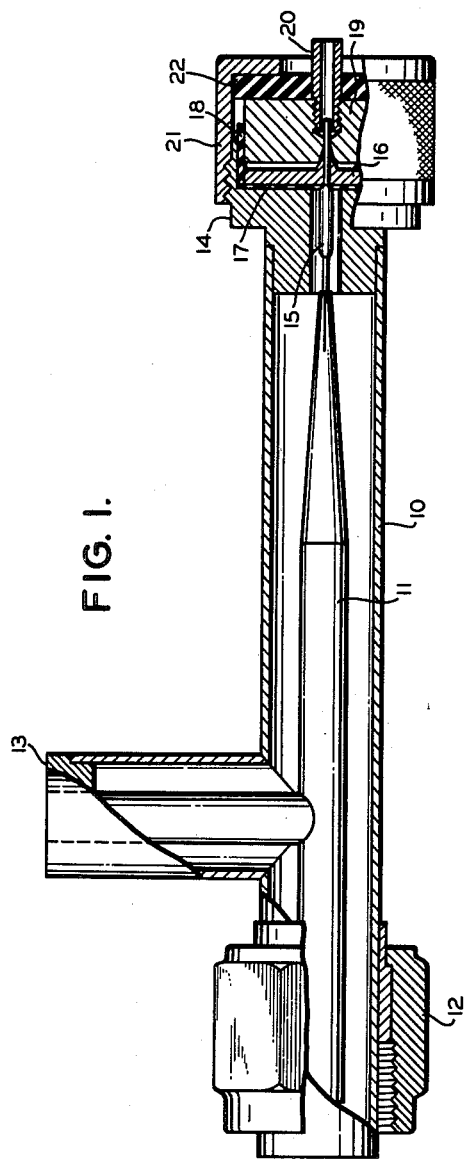
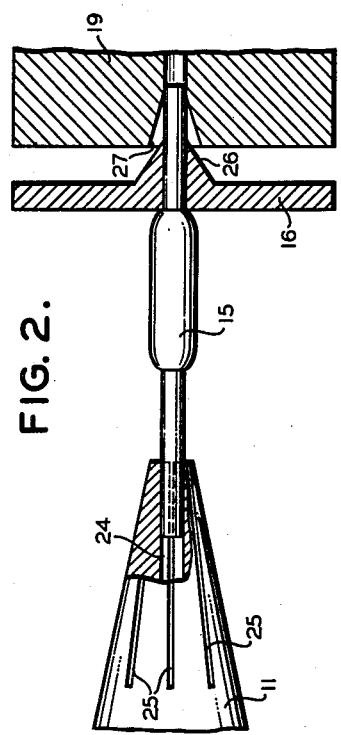
*INVENTORS*
DANA W. BOWERS, JR.
RUDOLPH N. GRIESHEIMER
BY
ATTORNEY Patented Apr. 27, 1954

2,677,109

UNITED STATES PATENT OFFICE 2,677,109

COAXIAL THERMISTOR MOUNT

Dana W. Bowers, Jr., Cambridge, and Rudolph N. Griesheimer, Belmont, Mass., assignors, by mesne assignments, to the United States of America as represented by the Secretary of the Navy Application May 1, 1946, Serial No. 666,222

6 Claims. (Cl. 333—22)

This invention relates to radio frequency power measurement and more particularly to a broadband thermistor mounting for power measurement in coaxial radio frequency transmission lines.

In radio frequency systems it is generally desirable to obtain a measurement of the electromagnetic power derived from the system. This is frequently accomplished by dissipating the power in a temperature sensitive resistor, known as a thermistor, and measuring the resulting change in resistance by means of a Wheatstone bridge circuit. The thermistor is frequently mounted as the termination of a coaxial transmission line conducting the energy to be measured. Several problems arise in mounting a thermistor for this purpose. The mounting must present the proper terminating impedance over a broad frequency range so that reasonably small changes in frequency of the radio frequency energy will not affect the impedance match. The mounting should also be simple with few adjustments and provide reliable electrical contact to the thermistor.

The object of this invention is to provide a thermistor mounting for coaxial transmission lines having the above features.

Other objects and advantages will be evident from the following specification when taken with the accompanying drawings in which:

Fig. 1 is a sectional view of the invention,

Fig. 2 is an enlarged sectional view of a part of Fig. 1.

Referring now to Fig. 1 a section of coaxial transmission line is shown formed by a hollow cylindrical outer conductor 10 and a round inner conductor 11. The coaxial line is provided with a coupling 12 to the source of electromagnetic energy. The coupling 12 may be any conventional design, the one shown is only for illustration. The inner conductor 11 is supported by a short circuited stub support 13 of a conventional broad band type. A mounting body 14 of conductive material is mechanically fastened to the outer conductor 10. A circular hole through body 14 forms an extension of the outer conductor 10 at a smaller diameter.

Inner conductor 11 ends at the opening of the hole through body 14. The inner conductor 11 tapers to a small diameter at its end, the taper extending a distance of approximately one-half wavelength from the end. Thermistor 15 is mounted to form an extension of inner conductor 11 through the hole in body 14. The wire leads of thermistor 15 make contact at one end to inner conductor 11 and at the other end to contact plate 16. The details of these connections will be discussed later. Contact plate 16 is a circular plate of soft conductive metal, preferably soft copper, and is insulated from body 14 by a mica disc 17 and an insulating cylinder 18. Backing block 19, a circular plate of conductive material, makes contact to plate 16 and provides an external connection through terminal post 20. End cap 21 threads onto the outside diameter of body 14 and holds plate 16 and block 19 in place. Block 19 is insulated from end cap 21 by a washer 22 of insulating material and from body 14 by the insulating cylinder 18.

The connections of thermistor 15 are shown in detail in Fig. 2. In the tapered end of inner conductor 11 is a small diameter hole 24. Hole 24 is slightly smaller in diameter than the wire leads of thermistor 15. Longitudinal slots 25 are cut through the tapered end of inner conductor 11 forming a series of fingers. One wire lead of thermistor 15 is fitted into hole 24 being firmly held by and in electrical contact with the fingers formed in the end of inner conductor 11. The other wire lead of thermistor 15 passes through a small hole concentrically located in contact plate 16 and ends in a like hole in backing block 19. This hole is slightly larger in diameter than the wire lead. On the face of contact plate 16 next to block 19 is a conical boss 26 concentrically located. On the face of block 19 next to plate 16 is a conical opening 27 leading to the small hole through block 19. The angle of the conical boss 26 is greater than the angle of the conical opening 27 so that the boss 26 will not completely enter opening 27. Referring to Fig. 1, when end cap 21 is threaded onto body 14, pressure is transmitted by insulating washer 22 to block 19 forcing it toward plate 16. Plate 16 is prevented from moving by mica disc 17 and body 14. Thus, opening 27 is forced onto boss 26 creating a radially inward pressure on boss 26. As plate 16 and boss 26 are of soft material, this pressure causes the hole through boss 26 to become smaller and the wire lead of thermistor 15 is firmly held and electrical contact is made between the wire lead and plate 16.

In operation, the coaxial line is coupled to the source of radio frequency energy to be measured by coupling 12. The radio frequency circuit is completed through the inner conductor 11, thermistor 15, plate 16, the capacity between plate 16 and body 14, body 14, and the outer conductor 10. The capacity between plate 16 and body 14 across mica disc 17 is large enough to form an effective short circuit for the radio frequency energy. The thermistor 15 presents both a resistive and inductive impedance. The effect of the reduced diameter of outer conductor formed by the hole in body 14 is to increase the capacity of the line at this point. This increased capacity cancels the inductive impedance of the thermistor 15. As the thermistor 15 is in series with the inner conductor, the resistance of the thermistor 15 is high enough to form a very low "Q" termination of the line. Thus, the terminating impedance does not vary greatly over a wide frequency range. The taper of the inner conductor 11 acts as an impedance matching section so that the coaxial transmission line is effectively terminated in the proper impedance.

To provide a measurement of the effect of the radio frequency energy on thermistor 15, a resistance bridge, such as a Wheatstone bridge, is generally connected to measure the resistance change of thermistor 15. This would require a direct circuit connection to thermistor 15. The direct current path is completed through the terminal 20, block 19, plate 16, the thermistor 15, inner conductor 11, shorted stub 13, and the outer conductor 10.

The novel features of this thermistor mounting are: the broad banding obtained by the constricted outer conductor in the region of the thermistor, the mounting of the thermistor in series with the inner conductor, and the method of making secure contact to the thermistor. It is to be understood that the invention is not to be limited to the details of operation and construction shown in the accompanying drawing and described above, except as appears hereafter in the claims.

What is claimed is:

1. A broadband thermistor mounting for measurement of radio frequency power comprising, a section of coaxial transmission line having a tubular outer conductor and a cylindrical inner conductor, means for coupling radio frequency power to said coaxial line, a mounting body of conductive material, said mounting body terminating said outer conductor and having a cylindrical opening passing through it concentric with said coaxial line, said inner conductor ending at a point even with said opening in said mounting body, a small diameter cylindrical opening and a plurality of longitudinal slots in the end of said inner conductor, a thermistor having a first and second wire lead, said thermistor coaxially mounted in said opening in said mounting body, said first wire lead extending into said opening in said inner conductor and making electrical contact thereto, a circular plate of a conductive material, said plate having a small diameter hole through its center and on one face a conical boss concentric with said hole, a cylindrical block of conductive material having a conical opening concentrically located on one face, said circular plate fitting against said mounting body and being insulated therefrom, said second thermistor lead passing through said hole in said circular plate, said cylindrical block mounted concentric with said circular plate with said conical boss entering said conical opening, means for forcing said cylindrical block against said plate causing said conical boss to make contact with said second thermistor lead, means for insulating said circular plate and cylindrical block from said mounting body, and a means for providing electrical contact to said circular plate and cylindrical block.

2. A broadband thermistor mounting for measurement of radio frequency power comprising, a section of coaxial transmission line having a tubular outer conductor and a cylindrical inner conductor, means for coupling radio frequency power to said coaxial line, a shorted stub support supporting said inner conductor coaxially with said outer conductor, said stub support providing a conductive connection from said inner conductor to said outer conductor, a mounting body of conductive material, said mounting body terminating said outer conductor and being mechanically and electrically fastened thereto, said mounting body having the form of a short cylinder with the end faces parallel and at right angles to the axis and having a cylindrical opening passing through it concentric with the axis, said inner conductor tapering to a smaller diameter and ending at a point even with said opening in said mounting body, said taper extending substantially one half wavelength along said inner conductor, a small diameter cylindrical opening and a plurality of longitudinal slots in the end of said inner conductor, a circular plate of conductive material, said plate having a small diameter circular hole through its center and on one face a conical boss concentric with said hole, a mica disc having a concentric opening, a cylindrical conducting backing block having a concentric conical opening in one face, said circular plate fitting against said mounting body and being separated therefrom by said mica discs, said backing block mounted concentric with said circular plate with said conical boss of said circular plate entering said conical opening of said backing block, a thermistor having a first and second wire lead, said thermistor coaxially mounted in said opening in said mounting body being supported by said wire leads, said first wire lead extending into said opening in said inner conductor and making electrical contact thereto, said second lead extending through said hole in said circular plate, means for holding said mica disc, circular plate and backing block concentric with said coaxial line and forcing said backing block against said circular plate causing said conical boss in said plate to make electrical contact to said second wire lead of said thermistor, means for insulating said circular plate and backing block from said mounting block, and a terminal post providing an external connection to said backing block.

3. A broad band thermistor mount for measurement of ultra high frequency power comprising, a thermistor having first and second wire leads and presenting resistive and inductive impedance, a section of coaxial transmission line having outer and inner conductors, one end of said inner conductor being adapted to receive said first lead whereby said thermistor forms an extension of said inner conductor, a section of conductive material mounted in capacitive relationship to said outer conductor and terminating said transmission line by being conductively connected to said inner conductor through said second thermistor lead, said outer conductor being constricted in the vicinity of said thermistor for increasing the capacity of the line at that point by an amount sufficient to resonate said inductive impedance of said thermistor whereby said thermistor presents substantially a purely resistive termination to said coaxial line, and said inner conductor being tapered at said lead-receiving end for matching said resistive termination to said coaxial line.

4. A thermistor mount as defined by claim 3 wherein said taper extends a distance of approximately one-half the wave length of said ultra-high frequency energy.

5. A broad band thermistor mount for measurement of ultra high frequency power comprising, a thermistor having first and second wire leads and presenting resistive and inductive impedance, a section of coaxial transmission line having an outer and inner conductor, one end of said inner conductor being adapted to receive said first lead of said thermistor whereby said thermistor forms an extension of said inner conductor, a clamp for electrically and mechanically coupling said second lead of said thermistor to an external circuit, said clamp comprising first and second conductive elements mounted within said outer conductor, said first conductive element having a hole in axial alignment with said inner conductor and a conical boss concentric with said hole, said second element having a conical hole in axial alignment with said inner conductor for receiving said boss, said second lead extending through said holes, means for urging said elements together whereby said boss is radially compressed to securely contact said lead, means for mounting said clamp in capacitive relationship with the end of said outer conductor, said outer conductor being constricted in diameter a predetermined amount at the location of said thermistor to increase the capacity of the line at that point to the value necessary to achieve series resonance with the inductance of said thermistor, and said lead-receiving end of said inner conductor being tapered, said taper extending a predetermined distance and acting as an impedance matching section to effectively terminate said coaxial transmission line.

6. Apparatus as defined by claim 5 wherein said taper extends a distance of approximately one-half the wave length of said ultra-high frequency energy.

References Cited in the file of this patent

UNITED STATES PATENTS

| Number | Name | Date |
|---|---|---|
| 2,273,547 | Radinger | Feb. 17, 1942 |
| 2,399,674 | Harrison | May 7, 1946 |
| 2,407,075 | Gurewitsch | Sept. 3, 1946 |
| 2,411,553 | Ramo | Nov. 26, 1946 |
| 2,434,610 | Feiker | Jan. 13, 1948 |
| 2,437,482 | Salisbury | May 9, 1948 |
| 2,438,915 | Hansen | Apr. 6, 1948 |
| 2,446,982 | Pound | Aug. 10, 1948 |
| 2,473,495 | Webber | June 14, 1949 |
| 2,525,901 | Hansen et al. | Oct. 17, 1950 |
| 2,590,477 | Weber | Mar. 25, 1952 |

OTHER REFERENCES

"Coaxial-Line Discontinuities," by Whinnery et al., published in Proceedings of the I. R. E., volume 32, No. 11, November, 1944, pp. 695–709.